Figure 1:
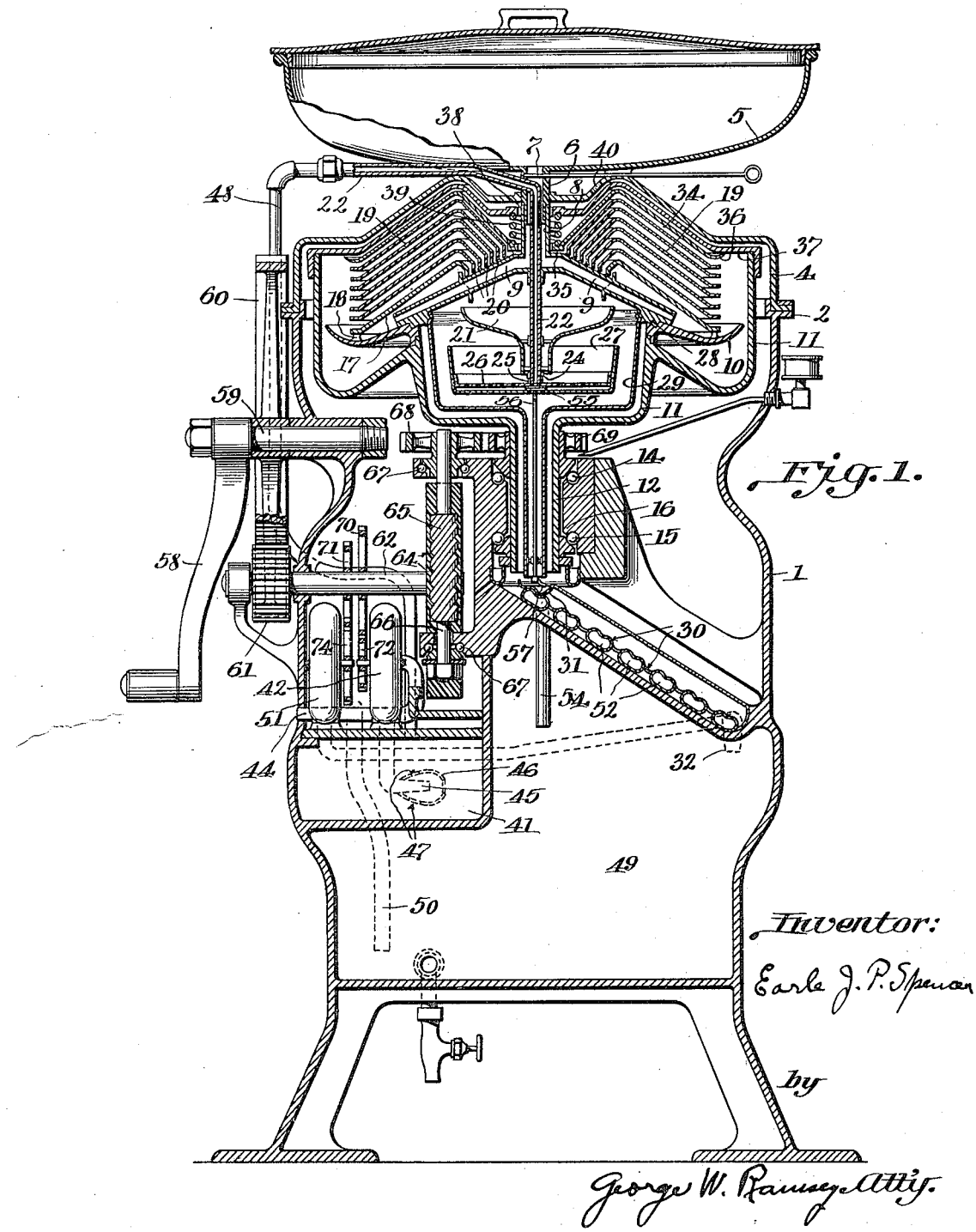

E. J. P. SPENCER.
PROCESS AND APPARATUS FOR PURIFYING MILK.
APPLICATION FILED OCT. 26, 1915.

1,210,865.

Patented Jan. 2, 1917.
2 SHEETS—SHEET 1.

Inventor:
Earle J. P. Spencer
by
George W. Ramsey, Atty.

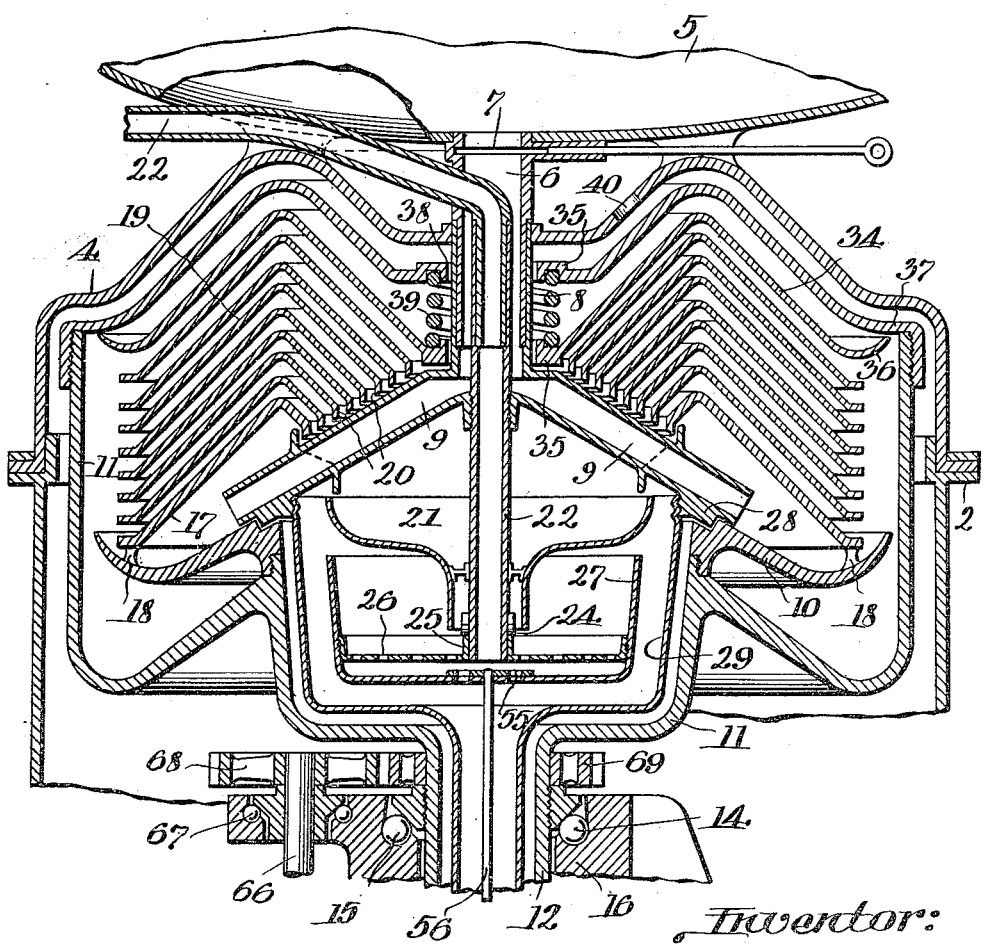

UNITED STATES PATENT OFFICE.

EARLE J. P. SPENCER, OF PHOENIX, NEW YORK.

PROCESS AND APPARATUS FOR PURIFYING MILK.

1,210,865.	Specification of Letters Patent.	Patented Jan. 2, 1917.

Application filed October 26, 1915. Serial No. 57,958.

*To all whom it may concern:*

Be it known that I, EARLE J. P. SPENCER, a citizen of the United States, and a resident of Phoenix, in the county of Oswego, State of New York, have invented certain new and useful Improvements in Processes and Apparatus for Purifying Milk, of which the following is a specification.

My device relates broadly to the process of purifying milk and devices for treating milk to carry out my process, which type of devices are known as milk purifiers.

The principal object of the present invention is a process and an apparatus for treating milk while still warm from the animal heat, wherein the milk is treated in such manner as to remove both undesirable gases occluded in the milk and undesirable foreign substances suspended in the milk without separating or otherwise affecting the normal distribution of the butter fat globules in the milk in their relation to the other milk constituents.

Another object of the present invention is to provide a process and a mechanism wherein milk is treated by centrifugal action and by aeration wherein a part of the aerating steps take place while the milk is subjected to centrifugal forces.

A still further object of the present invention is to provide a mechanism for treatment of milk wherein the milk is introduced through stationary ducts to substantially the periphery of the rotating bowl and then brought toward the center of said bowl in thin sheets after which it is permitted to fall in a shower through an ascending current of purified air and is received in a container wherein it is further aerated by streams of pure air forced upwardly through the milk in the container.

Another object of the present invention is to provide a mechanism for treating milk wherein during the treatment the milk is subjected to a centrifugal action to remove foreign substances in the nature of solids, and is then spread out in thin sheets which move counter to currents of air traveling over thin sheets of milk after which the milk is broken into drops or sprays which fall through an ascending column of purified air into a receptacle wherein the contents are subjected to further aeration because of isolated streams of pure air being forced through the perforated false bottom of the said receptacle.

Other and further objects of my invention will in part be obvious and will in part be pointed out hereinafter by reference to the drawings wherein like parts are used to represent like characters throughout the several figures thereof.

Figure 1 is a view showing a section of my apparatus taken on substantially the mid plane thereof. Fig. 2 is a detail view.

Milk purifiers have heretofore been constructed utilizing a centrifugal principle for eliminating certain solids and such constructions have been so arranged that the incoming flow of milk has passed through the zone for the collection of the undesirable solids. Milk purifiers including aerating devices, have also been devised and wherein the aerating device has been adapted to be introduced into a can of milk to aerate the entire contents of the can.

The present invention is embodied more particularly in a machine including centrifugal members which are so constructed relative to the collection chamber for foreign matter, that the milk supply is directly above such collection chamber so that the normal flow of milk does not disturb or pass through the contaminated zone. The milk after being subjected to the centrifugal action is compelled to pass through narrow passages between nested cones, through which passages air is directed in opposition to the flow of the milk, and after leaving the restricted passages the milk flows in broken up spray through ascending currents of purified air. The milk spray is directed to the central part of a container which is provided with a double bottom, the inner wall of which is perforated and pure air supplied between the walls of the double bottom ascends in streams through the milk in the container. As the container fills the milk flows over the outer edge of the container and is directed to an inclined chilling floor, from which the milk flows to suitable containers.

From the foregoing brief description it will be noted that my device includes a mechanism for treating milk by a series of independent processes or steps wherein the milk is mechanically purified by centrifugal action and is then subjected to aeration in three different forms, *i. e.*, with the milk in thin sheets, then in the spray, and finally in the form of an aerated body or liquid. After the milk is purified it is then chilled.

Experience has shown that where milk is chilled before the animal gases have escaped from the milk that these gases become occluded in the milk and cause the milk to rapidly deteriorate when it is again restored to normal temperature.

Referring now to the drawings, the machine in its preferred form for carrying out my process, includes a main frame 1 which is provided with a bead 2 that constitutes a shelf for supporting a cover frame 4. A stationary bowl 5 is mounted above the cover frame 4 and is provided at its central part with a downwardly depending tube 6, in which is mounted a suitable cut-off slide 7. The tube 6 preferably extends within the stationary distributing tube 8 is provided with branch tubes 9 that terminate adjacent the rotating annular lip 10 which is screwed upon the rotating bowl 11. The rotating bowl 11 includes a hollow main shaft 12 upon which are mounted suitable ball bearings 14 and 15. The cone members of the said ball bearings 14 and 15 are formed in a boss 16 integral with the main frame. The rotating bowl 11 carries a relatively heavy pressed metal cone 17 which rests upon spaced apart pillars 18 carried by the annular lip 10. The pressed metal cone 17 comprises a support for a plurality of thin metal cones 19 which are provided with suitably raised spaced apart ribs which separate one cone from another in a manner that is common and well known in the art. It will be noted that the thin metal cones 19 are synclinal in cross section on each side of the axis of rotation of the nested cones that is, fluid in passing from the outer edge of the cone toward the axis will first travel upwardly and then downwardly. The inner edges of the cones terminate in relatively straight portions 20 which are all directly above a funnel 21. Since the branch tubes 9 only occupy a relatively small portion of the space between the funnel 21 and the portions 20 of the cones, it is obvious that milk dripping from the edges of the cones will fall freely through this space and be collected by the said funnel. An air tube 22 is mounted to extend through the distributing tube 8 and constitutes a support for the funnel 21. The lower end of the air tube 22 is provided with studs 24 which cooperate with suitable openings in the boss 25 on the perforated bottom 26 of the pan 27 and comprise a suitable bayonet joint for supporting the said pan. It is to be noted that the lower end of the funnel 21 terminates adjacent the lower middle portion of the said pan so that milk falling into the said funnel 21 is directed to the central portion of the bottom of the said pan 27. The outer ends of the branch tubes 9 are preferably secured to an annular ring 28 which may be threaded or provided with other suitable connections to engage and support a large funnel 29 which leads the milk as it flows over the edges of the pan 27 downwardly to the chiller which comprises an inclined corrugated floor 30 formed of suitable chilling tubes hereinafter to be described. As the milk enters the chiller it passes through a distributing strainer 31 which has a tendency to spread the milk out over a flat area thereby facilitating the chilling operation. As the milk leaves the chiller it exits from the machine through the outlet tube 32. Immediately above the thin metal cones is a large cone 34 of heavier metal, and this cone terminates at its inner edge with a bead 35 and at its outer edge in an upwardly turned lip 36. The lip 36 is positioned close to the lid 37 of the rotating bowl 11 so that the milk is required to pass through the nested cones rather than over the large cone 34. The lid 37 for the rotating bowl 11 is spaced apart slightly from the supply tube 6 to provide an annular space 38. A coiled spring 39 is interposed between the lid 37 and the bead 35 on the large cone 34. It is also to be noted that an outlet air opening 40 is provided in the cover frame 4.

The base of the machine is provided with a pocket 41 constructed to retain water in which suitable cleansing material for example, chlorid of lime, is mixed, and the pump 42 draws a supply of air through a suitable tube such as 44, and forces this air through a nozzle 45 submerged in the water including the purifying chemical. This nozzle preferably is provided with a jacket 46 in which is an outlet opening and suitable intake openings 47. As the pump 42 operates the air being driven through the nozzle 45 produces an aspirating effect which draws the water and chemicals therein through the openings 47 thereby bringing the air into intimate contact with the cleansing fluid and supplying the space above the cleansing fluid with purified air. Preferably a bellows or air chamber, as is common in connection with air pumps, is connected with the air chamber above the cleansing fluid for the purpose of maintaining an even supply of air. A suitable air tube 48 leads upward and connects by disconnecting pipe couplings with the air pipe 22. The main frame of the machine is provided with a larger chamber or pocket comprising a container 49 for the chilling bath which is adapted to hold a supply of water in which pieces of ice are introduced through suitable doors (not shown) in the frame. A pipe 50 leads from the lower portion of the chilling bath 49 to the chill pump 51 which is connected with the lower end of a series of chill pipes 52 comprising a portion of the floor 30 of the chiller. A return pipe 54 is connected with the upper one of the chill pipes 52 and is adapted to return the chilling fluid to the container 49. It is to be noted that the chilled or cold water passes in at the lower pipe of the chill pipes 52 and out at the upper pipe so that as the warm milk flows downward the chilling fluid passes upward beneath the chill floor. This gives a maximum efficiency in the chilling operation.

It is to be noted that all of the various elements of the machine are provided with disconnecting joints so that it may be suitably assembled and disassembled for thorough washing and cleaning. In order to drain the pan 27 I have provided openings in both walls of the double bottom and have mounted a rotary cut-off 55 between these openings. This rotary cut-off connects with a vertical shaft 56 that is provided at its lower end with a small crank 57 that connects with a suitable rod leading out through the side of the machine to enable the cut-off to be opened thereby permitting the pan to be drained.

A suitable driving mechanism is provided for the centrifugal mechanism and for the various pumps, and includes a crank handle 58 that is mounted upon the main drive shaft 59 which carries a large gear wheel 60. The large gear wheel 60 meshes with and drives the smaller gear wheel 61 mounted on the auxiliary shaft 62. This auxiliary shaft 62 at its inner end carries a large worm wheel 64 which engages with and drives the worm 65 that is mounted upon the shaft 66 which is suitably supported in ball bearings 67. The upper end of the shaft 66 carries a relatively small gear wheel 68 that is in engagement with a smaller gear wheel 69 secured to the hollow main shaft 12 of the rotating bowl. The auxiliary shaft 62 carries intermediate its ends a pair of gears 70 and 71 which engage respectively with gears 72 and 74 which drive the air pump and chilling pump respectively. These pumps may be of any approved form, but as illustrated and preferred they are the usual type of centrifugal pump and therefore are not described in detail.

In operation the machine is first prepared by filling the chamber 41 with suitable cleansing material. The crank handle 58 is turned thereby transmitting power through the driving mechanism to the air pump 43, the circulating pump, 51 and the centrifugal devices including a rotating bowl 11. The milk to be purified is poured into the bowl 5 and a slide valve 7 is slightly opened to permit the milk to flow into and out of the branch distributing tubes 9. The milk after leaving the distributing tubes passes into the rotating centrifugal apparatus and the flow is directed upwardly and outwardly by the annular lip 10. Heavy foreign particles fall below the lip 10 into the annular space provided in the lower outer portion of the rotating bowl 11. The milk in continuing its passage through the machine falls from the inner edges 20 of the cones 19 and drops into the funnel 21. The milk is directed by the funnel 21 to the lower central portion of the pan 27 and the air supplied through the air tube 22 ascends in streams through the perforated bottom 26 and upwardly through the milk which fills the pan 27. As milk is supplied in the manner specified the pan 27 fills and overflows so that the milk continues its passage through the machine by falling through the large funnel 29 and over the chilling floor 30. The circulating pump 42 circulates ice water through the chilling tubes 52 so that the ice water enters the lower part of the chilling floor and circulates upwardly, while the milk flows downwardly over the chilling floor. When the milk reaches the lower part of the chilling floor it is conducted out of the machine by means of the outlet tube 32.

Having thus described my invention what I desire to claim is:—

1. A device of the character described in combination, a centrifugal device including a plurality of nested cones, a bowl in which said cones are mounted, the edge of said bowl extending below the peripheries of said cones to provide a receptacle for heavy material, an upwardly curved annular lip adjacent the lower edge of said nested cones, and stationary tubes constructed to supply milk over said annular lip and adjacent the outer edge of the lower cone whereby the annular velocity of the lip draws the streams of milk into thin sheets and directs same outwardly and upwardly.

2. In a device of the character described, in combination, a centrifugal element including a rotating bowl, a plurality of nested cones within said bowl and constructed to be rotated therewith, an annular upturned lip having its outer edge extending nearer to the wall of said bowl than the edges in said cones, said bowl extending below said lip to provide a chamber for receiving solids separated out by centrifugal action, and stationary means to supply milk above said annular lip and adjacent the outer edge of the lower cone whereby the annular velocity of the lip draws the milk into a thin sheet and directs same outwardly and upwardly.

3. In a device of the character described, in combination, a rotating bowl, a series of nested cones supported within said rotating bowl, each cone being provided with a continuous wall wherein the portions of said cones nearest the vertical axis of said bowl are inclined inwardly and downwardly, the inner edges of the cones terminating in such manner as to provide a free outlet through which the milk will fall by gravity as it leaves the cones, means to supply milk to the outer edges of said nested cones, and a stationary pan beneath the inner edges of said cones to receive milk flowing from said inner edges.

4. In a device of the character described, in combination, a rotating bowl, a plurality of nested cones within said bowl, the outer edges of said nested cones being substantially parallel to the walls of said bowl, the inner edges of said cones being arranged in such manner that the edge of the uppermost cone is nearest to the axis of said bowl and that the edge of the lowermost cone is the farthest from the said axis, whereby milk falling from the edge of each respective cone will fall in a separate vertical path, means to supply milk to the outer edges of said cones, and means to receive milk as it falls from the inner edges of said cones.

5. In a device of the character described, in combination, a centrifugal member adapted to remove undesirable solids from the milk, means to supply milk to said centrifugal member, in combination with aerating means located beneath the central portion of said centrifugal member and adapted to receive and aerate the milk after it leaves the centrifugal devices.

6. In a device of the class described, in combination, a centrifugal member adapted to separate undesirable solids from milk, said centrifugal member including a plurality of plates over which the milk is required to flow toward the axis of said member, a receptacle spaced apart from said plates and constructed to receive the milk as it flows from said plates, means to produce upward currents of pure air through said receptacle, said plates being constructed and arranged so that milk falling from said plates passes downwardly through an upwardly ascending current of purified air, and the milk flowing over said plates flows counter to an outwardly moving current of air passing through said plates.

7. A device of the class described, in combination, a centrifugal device including a rotating bowl, a removable cover for said bowl, devices to cause the milk to have a period of free fall during its passage through the machine, means for supplying milk adjacent the edge of said bowl, a hollow shaft for supporting said bowl, means to rotate said hollow shaft, and aerating devices in the central portion of said bowl to direct a flow of air upwardly through the milk and in opposition to the direction of the flow of the milk.

8. In a device of the character described, in combination, a rotating bowl, devices to supply milk adjacent the edge of said rotating bowl, means to lead said milk toward the central axis of said bowl, said means including devices to distribute the milk into separate vertical falling sheets, a pan into which the milk falls, and a downwardly extending hollow shaft providing an exit for the milk from said bowl.

9. In a device of the character described, in combination, a centrifugal member including a rotating bowl, a stationary pan in the center of said bowl, means to supply milk adjacent the edge of said bowl, and devices to lead said milk from the edges of said bowl toward the axis of said bowl, and a funnel for collecting said milk and directing same toward the center of said pan.

10. In a device of the character described, in combination, a centrifugal member including a rotating bowl, a stationary pan in the middle of said bowl, means to supply milk adjacent the edge of said bowl, a directing member to which said milk is supplied which leads said milk above a chamber in the lower portion of said bowl, and devices for leading the milk from the periphery of said bowl to said stationary pan.

11. In a device of the character described, in combination, a centrifugal member including a rotating bowl formed with a receiving pocket adjacent the lower edge of said bowl, means to supply milk to said bowl, directing devices for receiving said milk and directing the said milk above the said receiving pocket, a plurality of nested cones each having synclinal radial cross sections, and means to aerate the said milk as it leaves said centrifugal devices.

12. In a device of the character described, in combination, a centrifugal bowl provided with a receiving chamber adjacent the edge of said bowl, means for providing a non-disturbing flow of milk above said receiving chamber, aerating means in the middle of said bowl, and a hollow shaft for leading the milk from said centrifugal device.

13. The process of purification of milk, which consists in subjecting the milk in a flowing stream to centrifugal force, providing a non-disturbed zone for receiving foreign material, then breaking the flow of milk into a spray, subjecting same to an air bath of pure air, then collecting said milk in a pool and aerating the pool of milk by upward flowing streams of pure air ascending from the bottom of the pool.

14. The process of purifying milk which consists in subjecting a continuous flow of milk to centrifugal force, providing a non-disturbed zone adjacent said flow, breaking said flow of milk into a spray and subjecting said spray to an ascending current of purified air.

EARLE J. P. SPENCER.